United States Patent
Byrne et al.

(10) Patent No.: US 6,199,062 B1
(45) Date of Patent: Mar. 6, 2001

(54) REVERSE STRING INDEXING IN A RELATIONAL DATABASE FOR WILDCARD SEARCHING

(75) Inventors: Debora Jean Byrne; John Mark McConaughy; Shaw-Ben Shi; Chin-Long Shu, all of Austin; Trung Minh Tran, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/195,872

(22) Filed: Nov. 19, 1998

(51) Int. Cl.[7] .................................................... G06F 17/30
(52) U.S. Cl. ........................................................ 707/3; 707/4
(58) Field of Search .......................................... 707/3–5, 2

(56) References Cited

U.S. PATENT DOCUMENTS

| | | | |
|---|---|---|---|
| 4,914,569 | 4/1990 | Levine et al. | 707/8 |
| 5,319,779 | 6/1994 | Chang et al. | 707/3 |
| 5,586,288 | 12/1996 | Dahlberg | 711/108 |
| 5,630,114 | 5/1997 | Serra et al. | 707/100 |
| 5,694,593 | 12/1997 | Baclawski | 707/5 |
| 5,701,469 | 12/1997 | Brandii et al. | 707/102 |
| 5,710,915 | 1/1998 | McElhiney | 707/3 |
| 5,758,356 | 5/1998 | Hara et al. | 707/202 |
| 5,956,705 | * 9/1999 | Stevens et al. | 707/2 |
| 6,016,499 | * 1/2000 | Ferguson | 707/104 |
| 6,085,188 | * 7/2000 | Bachmann et al. | 707/3 |

FOREIGN PATENT DOCUMENTS

| | | |
|---|---|---|
| 4138548 | 9/1990 | (JP) . |
| 9190448 | 1/1996 | (JP) . |
| 1075242 | 8/1996 | (JP) . |
| 98/0195 | 1/1998 | (WO) . |

OTHER PUBLICATIONS

Shi et al., "An Enterprise Directory Solution with DB2," IBM Systems Journal, vol. 39, No. 2, Sep. 15, 1999.*

* cited by examiner

*Primary Examiner*—Paul V. Kulik
(74) *Attorney, Agent, or Firm*—Barry S. Newberger; Winstead Sechrest & Minick P.C.; Jeffrey S. LaBaw

(57) ABSTRACT

A method of hierarchical LDAP wildcard searching in an LDAP directory service having a relational database management system (DBMS) as a backing store. The relational database normally includes a forward index of the character strings in the database. The method begins by generating a reverse index of the character strings in the relational database. Depending on the position of one or more wildcards in the string, the forward index, the reverse index, or both indices, are used to generate the relational database query.

23 Claims, 2 Drawing Sheets

STRING SEARCH:

REVERSE STRING INDEXING IN A RELATIONAL DATABASE FOR WILDCARD SEARCHING

BACKGROUND OF THE INVENTION

1. Technical Field

This invention relates generally to providing directory services in a distributed computing environment.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of qualifiers including attribute name, attribute value and Boolean operators like AND, OR and NOT. Users can use the filter to perform complex search operations.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

LDAP entries consist of attribute-value pairs. Within the relational database (e.g., DB/2), a separate table is created for each of the attributes allowed within the LDAP schema. Within this table, the attribute values are stored, along with an entry ID (EID) to which the attribute values belong. If the value of the attribute is less than the value for an indexable column, then an index is created based on the attribute value and the eid. Further, if the value exceeds the maximum length for an indexable column, an additional column is created that contains a truncated value. By generating the index (referred to below as a "forward" index for reasons that will be seen), the database is much faster at retrieving data during searches.

Wildcard search support is imperative when creating any searchable database. Although the use of the above-described index speeds most searches, searches beginning with a wildcard "*" (e.g., the string "*something") do not perform nearly as well within relational databases such as DB/2. Primarily, this is because such databases use b-trees for indexing. In such known schemes, the b-tree search is then based on the leading characters of the search string. If a wildcard is present at the beginning of the string, the b-tree search algorithm has a difficult time finding a starting point. As a result, the search cannot be performed efficiently.

The present invention addresses the problem of inefficient wildcard searching in a relational database.

BRIEF SUMMARY OF THE INVENTION

It is a primary object of this invention to provide a method for wildcard searching of a relational database using hierarchical, filter-based queries, such as LDAP.

Another primary object of this invention is to force a wildcard search character into a position that is optimal for a particular database search algorithm.

Still another important object of this invention is to provide a mechanism that reverses a given character string (or some portion thereof) to optimize wildcard searching of a relational database.

Yet another important object of this invention is to map a given character string having a wildcard operator into a character string that may be optimally searched given the available database search strategy.

A more specific object of this invention is to efficiently implement LDAP SQL search queries having wildcard search characters.

These and other objects of the invention are described in a method for wildcard searching a relational database, e.g., by using hierarchical, filter-based queries. The method begins by generating a forward index of the character strings in the database. The method then generates a reverse index of the character strings in the relational database. The reverse index is generating, preferably by mirroring (i.e. creating a mirror image of) the forward index. Upon receipt of a hierarchical, filter-based query having a search string with a wildcard, the reverse index is then used to generate the corresponding relational database query (e.g., in SQL) if the wildcard is at a given position within the search string. Thus, for example, the given position is a leading position in the search string. Alternatively, the given position is an intermediate position in the search string and a number of characters trailing the wildcard is greater than a number of characters leading the wildcard. If the wildcard is not at the given position within the search string, the forward index is used to generate the relational database query. In either case, the relational database query is then used to access the relational database and return search results.

In a preferred embodiment, the filter-based query is a Lightweight Directory Access Protocol (LDAP) directory service query and the relational database is DB/2.

According to another aspect of the present invention, both forward and reverse indices may be used to search portions of the same search string. In this method of wildcard searching, the forward and reverse indices are first generated. Upon receipt of the hierarchical, filter-based query having the search string with the wildcard, a determination is made regarding whether the forward index, the reverse index, or both indices, should be used to generate the relational database query. This determination typically depend on the relative position of the wildcard in the search string. As a result of the determination, the relational database query is then generated and used to access the relational database. When both indices are used, typically the search is performed on a first portion of the string up to the wildcard using the forward index. The search is performed on the remaining portion of the string (after the wildcard) using the reverse index on the reverse of the second portion.

Thus, according to the present invention, an additional column (identical to the indexed column) is created in the relational database; however, the data in this column is stored in reverse order to facilitate creation of a SQL query that takes advantage of the relational database strengths. Any incoming searches beginning with a wildcard are then reversed, and the reverse index is used instead of the forward index.

In addition to handling the scenario where the wildcard is at the beginning of the string, the reverse index of the invention is also used to process more complicated scenarios, e.g., a wildcard at the middle or more than one wildcards in the string.

Preferably, the invention is implemented in a computer program that executes in a computer to carry out the method steps. The forward index and its corresponding reverse index preferably are stored in the relational database. The wildcard search method facilitates the implementation of a reliable and scaleable enterprise directory solution, wherein a preferred embodiment is LDAP with a DB/2 backing store.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
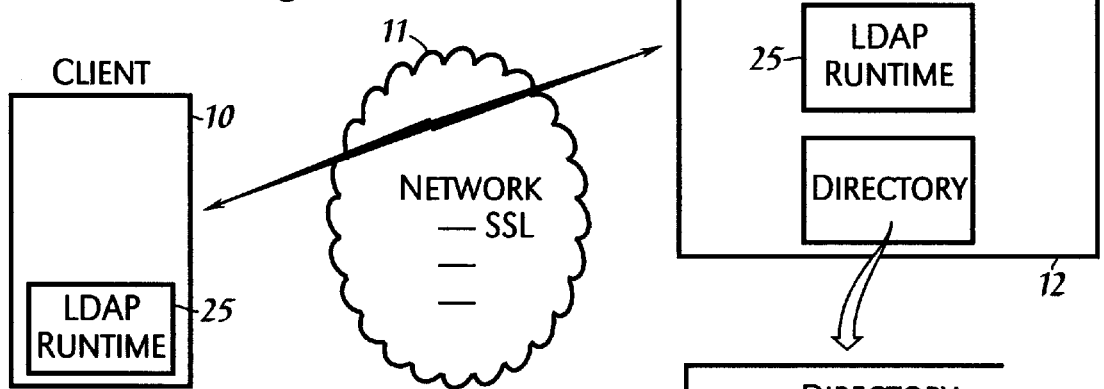
FIG. 1 is a representative LDAP directory service implementation.
Figure 2:
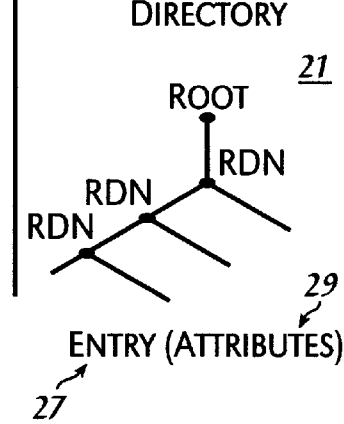
FIG. 2 is a simplified LDAP directory.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory "runtime" component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the "scope" supported by LDAP search are: base, one level and subtree. LDAP does not support search for arbitrary tree levels and path enumeration.

Figure 3:
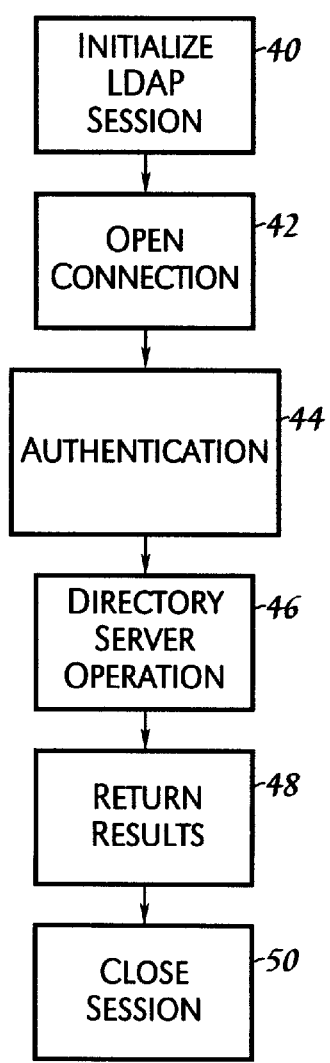
FIG. 3 is a flowchart of an LDAP directory session.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_inito returns a handle to the client, and this handle may allow multiple connections to be open at one time. At step 44, the client authenticates to the LDAP server using, for example, an API ldap_bind( ) function. At step 46, one or more LDAP operations are performed. For example, the API function idap_search( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

Figure 4:
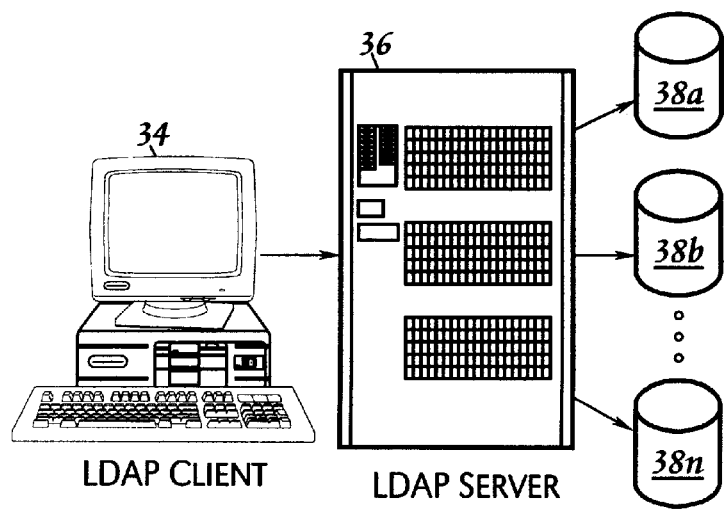
FIG. 4 shows a representative LDAP directory service implementation having a relational database backing store.

It may be desirable to store LDAP directory data in a backing store. FIG. 4 illustrates a representative LDAP directory service implementations that use a relational database management system (RDBMS) for this purpose. This system illustrates a possible LDAP directory service in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4, an LDAP client 34 can connect to a number of networked databases 38a–58n through an LDAP server 36. The databases 38a–38n contain the directory information. However, from the user's perspective, the LDAP server 36 stores all the information without knowing the database 38 in which the data is actually located. With this configuration, the LDAP server 36 is freed from managing the physical data storage and is able to retrieve information from multiple database servers 38 which work together to form a huge data storage.

One of ordinary skill should appreciate that the system architectures illustrated in FIG. 4 is not to be taken as limiting the present invention. The inventive technique may be used to search any relational database using any type of query (and not merely hierarchical, filter-based database queries). When the invention is implemented within an LDAP directory service having a relational database management system (DBMS) as a backing store, the service takes advantage of several LDAP table structures. Further details about these structures (as well as the SQL SELECT statements used by the LDAP/DB/2 search routines) are provided in U.S. Ser. No. 09/050,503, titled "A Fast And Efficient Method To Support Hierarchical LDAP Searches With Relational Tables", assigned to the assignee of this application, and incorporated herein by reference.

Figure 5:
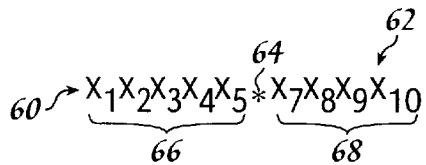
FIG. 5 is simplified representation of a search string that is manipulated by the wildcard search mechanism of the present invention.

FIG. 5 illustrates a search string 60 having a number of character positions 62. Each character position is capable of taking on a wildcard search character, which is typically designated by an asterisk ("*") In this example, the wildcard character 64 is located at an intermediate position of the search string 60. Thus, a first portion (or substring) 66 of the search string comprises the characters leading the wildcard 64, and a second portion 68 of the search string comprises the characters trailing the wildcard. This example is provided simply to facilitate the description of the nomenclature used herein when discussing a search string. The search string may include multiple wildcards.

Figure 6:
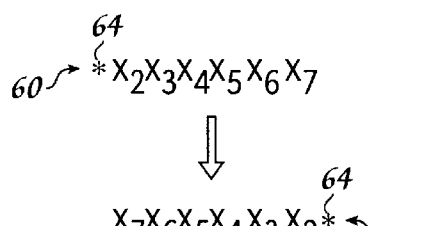
FIG. 6 is a representation of a search string having a leading wildcard and the resulting search string generated by the present invention.
Figure 7:
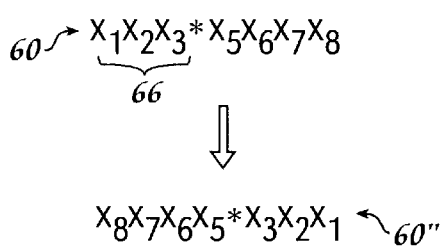
FIG. 7 is a representative search string having an intermediate wildcard and one type of search string that is generated by the inventive method.
Figure 8:
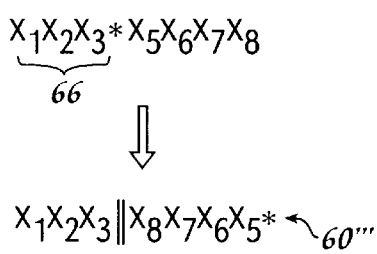
FIG. 8 is the search string of FIG. 7 illustrating a second type of search string that is generated by the inventive method.

According to the present invention as illustrated in FIG. 6, when the wildcard 64 is located at the leading position of the search string 60, the search string (preferably in its entirety) is reversed, as illustrated by reference numeral 60', to facilitate the search process. Moreover, when the wildcard 64 is located in an intermediate position within the search string, two possible approaches may be used to search the string. In the example shown in FIG. 7, the number of characters in the substring 66 (the leading portion) is less than the number of characters in the substring 68 (the trailing portion); as a result, it is desired to reverse the entire string, as illustrated by reference numeral 60' to enhance search efficiency. FIG. 8 shows an alternative technique wherein the leading substring 66 of the character string is maintained in its forward direction while the trailing substring 68 is reversed. As can be seen, this latter technique places the wildcard 64 at the trailing edge of the new composite search string 60'''. In this manner, a search of $x_1 x_2 x_3$ is continued with a search of $x_8 x_7 x_6 x_5 *$. By forcing the wildcard 54 into the trailing character position (or, at least, as close to that position as possible), the composite search is performed more efficiently when using a relational database backing store.

The process for generating the reverse character strings is now described. As noted above, LDAP entries consist of attribute-value pairs. Within the relational database (e.g., DB/2), a separate table is created for each of the attributes allowed within the LDAP schema. Within this table, the attribute values are stored, along with an entry ID (EID) to which the attribute values belong. If the value of the attribute is less than the value for an indexable column, then an index is created based on the attribute value and the EID. Further, if the value exceeds the maximum length for an indexable column, an additional column is created that contains a truncated value. This column with the truncated value is then indexed based on the value in the EID. This index is referred to herein as an forward index. According to the invention, the forward index is mirrored into a reverse index to facilitate wildcard searching. In particular, within the LDAP schema files, a given user (e.g., the directory administrator) provides attribute names and characteristics. The table below illustrates several attribute definitions provided as a default schema:

| attribute | cn | cis | cn | 128 | normal |
|---|---|---|---|---|---|
| attribute | member | dn | member | 1000 | normal |

The first column states that an attribute is being defined. The second column is the attribute name. The third column specifies the syntax for that attribute. The fourth column specifies the table name to be used within the relational database. By convention in DB/2, table names can be no longer than 18 characters; thus, simply using the attribute name is not always acceptable. The fifth column specifies the maximum length for the attribute value, and the last column specifies the attribute access class used in access control. This information is kept in memory while the program is running within a so-called attribute definition structure.

When the DB/2 server is first started, the tables are created, with one table created per attribute found within the schema files. Thus, for example, the definition of "cn" results in an attribute table as follows:

| TableName: CN | |
|---|---|
| EID | CN |

Additionally, an index is created on this table relating the values as follows: (EID,CN) As is well-known, DB/2 is capable of indexing columns up to 240 characters. A truncated column, therefore, is not created for cn in this representative example. The value column within the table preferably has the same name as the table name in all cases. Taking another example, the definition of "member" would result in an attribute table as follows:

| TableName: MEMBER | | |
|---|---|---|
| EID | MEMBER | MEMBER_T |

The index created for this table would be the pair: (EID, MEMBER_T). In this example, a truncated column is created because the value for the member attribute can be up to 1000 characters. This value is longer than an allowable indexable column in DB/2. Preferably, the truncated index column name is formed by appending a _T to the column name. If necessary, the column name itself is truncated to create a name under the DB/2 column name size limit.

According to the present invention, to improve searches that begin with (or that otherwise include) a wildcard, an additional column is added. Preferably, the contents of this column are the mirror image of those within the forward-indexed column. Thus, for example, for table CN as described above, the forward-indexed column is the cn column. For the MEMBER table example, the forward-indexed column is the MEMBER_T column. As will be seen, the resulting data generate a so-called reverse index that is used to facilitate the wildcard search strategies described above and illustrated in FIGS. 6–8.

When creating the tables, the additional column preferably is created on all tables that do not contain binary values within their attributes. Tables with binary attributes are clearly identifiable by "bin" in the syntax column of the attribute definition. Within the memory-resident attribute description structures, a field is kept that identifies the name of the indexed column. To avoid adding additional data to the structure, the reverse-indexed column preferably is identical to the indexed column but includes a "R" prefix. This column is then created. The two previously mentioned tables now look as follows:

| TableName: CN | | |
|---|---|---|
| EID | CN | RCN |

This table includes a forward index on (EID,CN) and a reverse index on (EID,RCN).

| TableName:MEMBER | | | |
|---|---|---|---|
| EID | MEMBER | MEMBER_T | RMEMBER_T |

This table includes a forward index on (EID,MEMBER_T) and a reverse index on (EID,RMEMBER_T).

The above-described technique provides a simple method of accessing the reverse columns within the code without the need of additional storage space within the data structure. To prepend the "R" to the reverse column name, it may be desirable cr, in some instances, necessary to truncate an extra letter of the column name. For instance, consider the following attribute definition and its associated table structure:

| attribute | registeredAddress | cis | registereAddress | 500 | normal |
|---|---|---|---|---|---|

| TableName:REGISTERED ADDRESS | | | |
|---|---|---|---|
| EID | REGISTEREDADDRESS | REGISTEREDADDRE_T | RREGISTEREDADDRE_T |

The name "REGISTEREDADDRESS" (in this representative example) is one less than the size allowed (in DB/2) for a column name. Thus, in the preferred implementation of inventive scheme (for this type of database), and to allow for the R and _T values, two characters are truncated from the name to create the base for the indexed column name. The _T is appended for the forward truncated index. The R is prepended and the _T appended for the backwards truncated index. The same procedure is then followed when creating the names for columns in tables where a truncated value is not needed. The difference is that the original column name is kept to one less than the maximum allowed value so that an "R" may be prepended.

Upon receiving an add request, the attribute value is inserted into the value column (namely, that column that matches the table name). If necessary, a truncated value is stored within the truncated column. Additionally, the indexed value is reversed and stored within the reverse indexed column (or truncated column). For example, a representative table looks as follows when adding the attribute values CN: Smith and CN: John Smith to an entry with an EID of 4:

| TableName: CN | | |
|---|---|---|
| EID | CN | RCN |
| 4 | SMITH | HTIMS |
| 4 | JOHN SMITH | HTIMS NHOJ |

Consider the following example search performed on a search string "*sm*". In this example, an SQL query, such as SELECT EID FROM CN WHERE CN LIKE ?, is used, with ?=sm*. Without the reverse index, this query is the same query for a search of the string "smith". With the reverse index, however, the query now reads as follows: SELECT EID FROM CN WHERE RCN LIKE ? ESCAPE '\', with ?=htims*". As can be seen, the wildcard is now located at the trailing end of the character search string. This query takes advantage of an operation on which DB/2 performs very well, namely, a search with a wildcard at the end.

Figure 9:
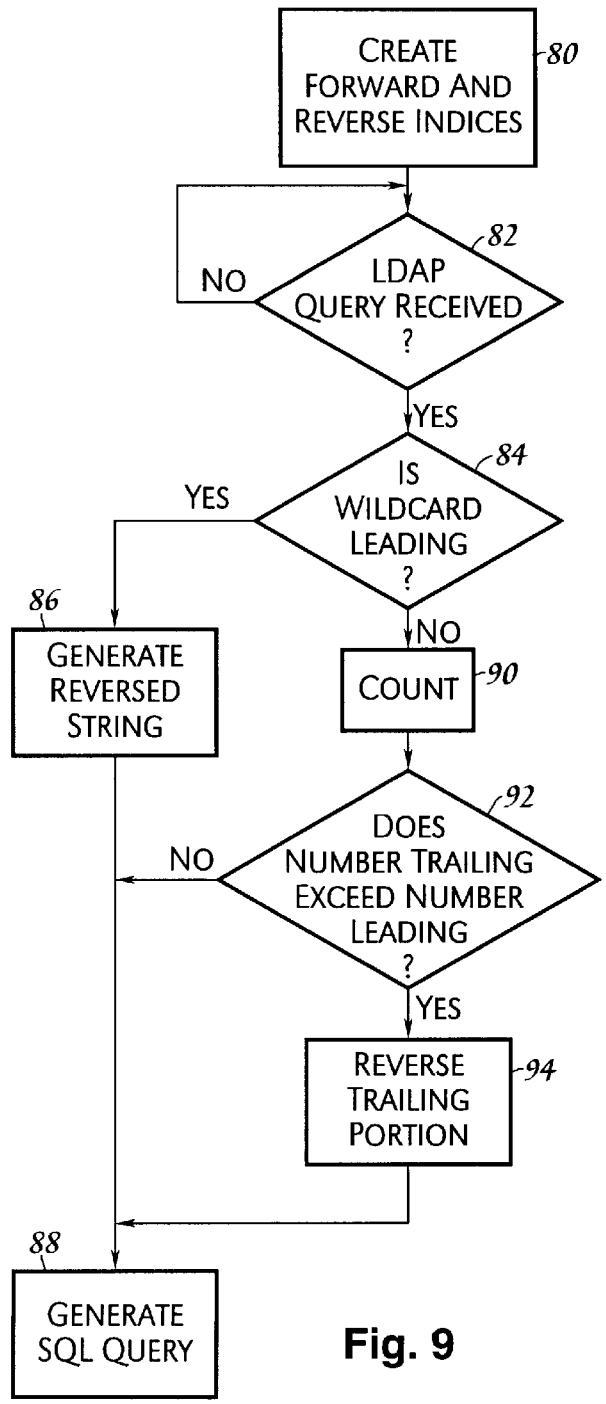
FIG. 9 is a simplified flowchart of the inventive method for wildcard searching in an LDAP directory service having a relational database management system as a backing store.

Wildcards are often used within the middle of a search string just as often as at the beginning or the end. The present invention thus provides a mechanism for enhancing wildcard searching using the reverse index in such scenarios. In particular, the reverse index column is used in these cases to improve performance results. FIG. 9 illustrates a simplified flowchart of the wildcard search mechanism of the present invention wherein potentially both the forward and reverse indices are applied to different portions of the same search string. The routine begins at step 80 by creating the forward and reverse indices. This process has been described and illustrated above in detail. One of ordinary skill in the art will appreciate that the reverse index is continually updated as new character string entries are created in the forward index. At step 82, the routine runs a test to determine if an LDAP query has been received from the LDAP directory service. If not, the routine cycles. If, however, the outcome of the test at step 82 is positive, the routine continues at step 84 (assuming the existence of a wildcard in the search string)

to determine whether the wildcard is at a leading edge of the search string. If so, the routine branches to step 86 and (using the reverse index) generates a reversed search string. The reversed search string is then used to generate the relational database query in step 88. If, however, the outcome of the test at step 84 indicates that the leading character is not a wildcard, the routine continues at step 90 to count the number of characters leading the wildcard and the number of characters trailing the wildcard.

At step 92, a test is performed to determine whether the number of characters trailing the wildcard is greater than the number of characters leading the wildcard. If the number of characters trailing the wildcard is greater than the number of characters leading the wildcard, an optimal search may not be performed (as the wildcard is near the front of the search string). Thus, if the outcome of the test at step 92 is positive, the routine continues at step 94 by reversing the trailing portion of the string (including the wildcard) to position the wildcard at the trailing edge. The routine then returns to step 88 wherein the composite string is used to generate the database query. If the outcome of the test at step 92 is negative, however, the leading substring is larger and thus use of the reverse index may not be needed. (It may still be applied to the trailing substring if desired). The routine thus returns to step 88 as previously described. This completes the processing.

To provide a concrete example, consider a string such as "some*thing" (having the wildcard in the middle). As noted above, two different methods may be used with the reverse index. First, the reverse index is used in conjunction with the normal forward index. In particular, the search is performed on the first portion of the string up to the wildcard using the forward index. The search is performed on the remaining portion of the string (after the wildcard) using the reverse index on the reverse of the second portion. In this illustrative example, the query for this technique looks as follows: SELECT EID FROM CN WHERE CN LIKE ? ESCAPE '\' AND RCN LIKE ? ESCAPE '\'. The first parameter marker (?) is "some*" and the second parameter marker is "gniht*".

The reverse index is also useful if the wildcard is present near a particular end of the string, such as "so*mething" or "somethi*ng". Because the typical b-tree search implementation is based on the leading characters in the string, the second search (somethi*ng) performs much better than the first search (so*mething) because the second search has a much longer leading character string. The present invention exploits this property by using the reverse index to generate a relational database query if the wildcard is at a given position within the search string. As noted above, if the given position is a leading position in the search string, the reverse index is used. Moreover, if the given position is an intermediate position in the search string and a number of characters trailing the wildcard is greater than a number of characters leading the wildcard, the reverse string is also used.

One of ordinary skill will appreciate that the inventive approach can be extended if multiple wildcards appear in the string. In such case, the length of the string to the first wildcard, and the length from the last wildcard to the end, are measured. A single search may then be run. If the length of the string to the first wildcard character is longer than the length from the last wildcard to the end, the forward index is used. If, however, the length from the last wildcard to the end of the string is longer than the length to the first wildcard, the reverse search is used. For example a search on "so*mething*likethis" would use a reverse search, whereas a search on "something*like*this" would use a forward search.

The present invention thus exploits the property of the b-tree search wherein searches of trailing wildcards provide enhanced performance. Thus, the performance of a query involving the search string "so*mething" is enhanced using the reverse index column into "gnihtem*os". According to the present invention, a much longer leading character string is generated (seven characters instead of two), thereby allowing the existing relational database b-tree search to perform faster and more efficiently.

Combining the forward and reverse index enables the invention to perform well for substring matches without the space requirement that other prior art techniques require. Thus, for example, the known Netscape directory server generates all substring components of a fixed length, and indexes those. Performance tests show that this invention improves the wildcard substring search by a substantial margin (up to 500% in some cases) making the wildcard searches competitive to other LDAP implementations within the industry. The inventive technique presented here can be applied to any commercial relational database and b-tree based LDAP server implementations (like the Netscape LDAP server).

One of ordinary skill in the art will appreciate that the present invention forces the wildcard in a search string into a position that is takes advantage of the particular strengths of the search algorithm being used to access the database. Thus, the present invention may be generalized to cover any suitable technique for forcing one or more wildcards into position(s) that are optimized for the particular search algorithm being used to access the stored data of interest. In particular, upon receipt of a query having a search string with a wildcard, the inventive method processes the search string to force the wildcard into an optimal search position as a function of an algorithm used to search the database. The processed search string is then used to access the database.

As noted above, the invention may be implemented in any hierarchical directory service in which a relational database management system (RDBMS) is used to provide a backing store function. Thus, for example, the principles of the invention may be carried out in an X.500 directory service or hereinafter-developed LDAP implementations. The SQL query generated according to the present invention is used to access the relational database, and results are then returned in response to this query. The invention may also be implemented within a relational database management system being used as an add-on to a directory service. One of ordinary skill will appreciate that the invention can be applied to any relational database management system (RDBMS) and not simply DB/2. Thus, for example, the relational database may be Oracle, Sybase or any other third party supplied backing store.

Moreover, although the preferred embodiment has been described in the context of generating a Structured Query Language (SQL) query, the inventive technique should be broadly construed to extend to any relational database query language. Also, the inventive technique may be driven by a database query, and not simply an LDAP query as described in the preferred embodiment.

One of the preferred embodiments of the routines of this invention is as a set of instructions (computer program code) in a code module resident in or downloadable to the random access memory of a computer.

Having thus described our invention, what we claim as new and desire to secure by letters patent is set forth in the following claims:

What is claimed is:

1. A method for wildcard searching a relational database using hierarchical, filter-based queries, comprising the steps of:
   generating a reverse index of character strings in the relational database;
   upon receipt of a hierarchical, filter-based query having a search string with a wildcard, using the reverse index to generate a relational database query if the wildcard is at a given position within the search string; and
   using the relational database query to access the relational database.

2. The method as described in claim 1 wherein the given position is a leading position in the search string.

3. The method as described in claim 1 wherein the given position is an intermediate position in the search string and a number of characters trailing the wildcard is greater than a number of characters leading the wildcard.

4. The method as described in claim 1 further including the step of using a forward index to generate a relational database query if the wildcard is not at a given position within the search string.

5. The method as described in claim 4 wherein the given position is an intermediate position in the search string and a number of characters trailing the wildcard is less than a number of characters leading the wildcard.

6. The method as described in claim 1 wherein the reverse index is generated by creating a mirror image of a forward index.

7. The method as described in claim 1 wherein the filter-based query is a Lightweight Directory Access Protocol (LDAP) directory service query.

8. A method for wildcard searching a relational database using hierarchical, filter-based queries, comprising the steps of:
   generating a forward index of character strings in the relational database;
   generating a reverse index by mirroring the forward index;
   upon receipt of a hierarchical, filter-based query having a search string with at least one wildcard, determining whether the forward index, the reverse index, or both indices, should be used to generate a relational database query;
   as a result of the determination, generating the relational database query; and
   using the relational database query to access the relational database.

9. The method as described in claim 8 wherein the reverse index is applied to the search string to generate the relational database query.

10. The method as described in claim 8 wherein the forward index is applied to a first portion of the search string and the reverse index is applied to a second portion of the search string to generate the relational database query.

11. The method as described in claim 10 wherein the wildcard is located in an intermediate position within the search string and a number of a number of characters leading the wildcard exceeds the number of characters trailing the wildcard.

12. The method as described in claim 8 wherein the search string includes two or more wildcards.

13. A method for searching a relational database from a Lightweight Directory Access Protocol (LDAP) directory service generating filter-based queries, the relational database having stored therein a forward index of character strings and a reverse index that is a mirror image of the forward index, the method comprising the steps of:
   upon receipt of an LDAP query having a search string with a wildcard, using the forward index, the reverse index, or both indices, to generate a relational database query depending on a position of at least one wildcard within the search string; and
   using the relational database query to access the relational database.

14. A computer program product in computer-readable media for searching a relational database using hierarchical, filter-based queries, comprising:
   means for generating a reverse index of character strings in the relational database; and
   means responsive to receipt of a hierarchical, filter-based query having a search string with a wildcard for using the reverse index to generate a relational database query if the wildcard is at a given position within the search string.

15. The computer program product as described in claim 14 wherein the given position is a leading position in the search string.

16. The computer program product as described in claim 14 wherein the given position is an intermediate position in the search string and a number of characters trailing the wildcard is greater than a number of characters leading the wildcard.

17. The computer program product as described in claim 14 wherein the filter-based query is a Lightweight Directory Access Protocol (LDAP) directory service query.

18. A computer program product in computer-readable media for searching a relational database using hierarchical, filter-based queries, comprising:
   means for generating a reverse index by mirroring a forward index of character strings in the relational database; and
   means responsive to receipt of a hierarchical, filter-based query having a search string with at least one wildcard, for using the forward index, the reverse index, or both indices, to generate a relational database query.

19. A directory service, comprising:
   a directory organized as a naming hierarchy having a plurality of entries each represented by a unique identifier;
   a relational database management system having a backing store for storing directory data;
   means for searching the directory, comprising:
     means for generating a reverse index by mirroring a forward index of character strings in the relational database; and
     means responsive to receipt of a hierarchical, filter-based query having a search string with at least one wildcard, for using the forward index, the reverse index, or both indices, to generate a relational database query.

20. The directory service as described in claim 19 wherein the directory is compliant with the Lightweight Directory Access Protocol (LDAP).

21. In a directory service having a directory organized as a naming hierarchy, the hierarchy including a plurality of entries each represented by a unique identifier, the improvement comprising:
   a relational database management system having a backing store for storing directory data;
   means for searching the directory, comprising:

means for generating a reverse index by mirroring a forward index of character strings in the relational database; and means responsive to receipt of a hierarchical, filter-based query having a search string with at least one wildcard, for using the forward index, the reverse index, or both indices, to generate a relational database query.

22. In the directory service as described in claim 21 wherein the directory is compliant with the Lightweight Directory Access Protocol (LDAP).

23. A method for wildcard searching a database using a database query, comprising the steps of:

upon receipt of a query having a search string with a wildcard, processing the search string to force the wildcard into an optimal search position as a function of an algorithm used to search the database;

generating a database query from the processed search string; and using the database query to access the database.

* * * * *